US012583049B2

(12) United States Patent

Cooper et al.

(10) Patent No.: US 12,583,049 B2

(45) Date of Patent: Mar. 24, 2026

(54) ORIENTATION AND GUIDE MECHANISM FOR NON-CIRCULAR WELD WIRE

(71) Applicant: EL Cooper Properties LLC, Clarklake, MI (US)

(72) Inventors: Edward L. Cooper, Clarklake, MI (US); Steven J. Hayes, Addison, MI (US)

(73) Assignee: EL Cooper Properties LLC, Clarklake, MI (US)

( * ) Notice: Subject to any disclaimer, the term of this patent is extended or adjusted under 35 U.S.C. 154(b) by 922 days.

(21) Appl. No.: 17/841,754

(22) Filed: Jun. 16, 2022

(65) Prior Publication Data

US 2022/0402063 A1     Dec. 22, 2022

Related U.S. Application Data

(60) Provisional application No. 63/211,324, filed on Jun. 16, 2021.

(51) Int. Cl.
B23K 9/133          (2006.01)
B23K 9/28           (2006.01)

(52) U.S. Cl.
CPC .............. B23K 9/1336 (2013.01); B23K 9/28 (2013.01)

(58) Field of Classification Search
CPC .... B23K 9/28; B23K 9/1336; B23K 35/0283; B23K 9/02; B23K 9/122; B23K 9/167; B23K 9/173; B23K 9/32; B23K 26/211; B23K 26/244; B23K 26/702
See application file for complete search history.

(56) References Cited

U.S. PATENT DOCUMENTS

| | | | |
|---|---|---|---|
| 4,173,235 A | 11/1979 | Tipper | |
| 4,621,185 A | 11/1986 | Brown | |
| 4,749,841 A | 6/1988 | Galantino et al. | |
| 6,989,507 B2 | 1/2006 | Clark | |
| 8,878,098 B2 | 11/2014 | Cooper et al. | |
| 2012/0152921 A1 | 6/2012 | Peters et al. | |
| 2013/0327749 A1 | 12/2013 | Denney et al. | |
| 2014/0027422 A1 | 1/2014 | Panelli | |
| 2014/0042131 A1 | 2/2014 | Ash | |
| 2014/0263193 A1 | 9/2014 | Denney | |
| 2017/0368637 A1 | 12/2017 | Giese | |
| 2020/0016694 A1* | 1/2020 | Cooper .............. | B23K 35/0261 |
| 2020/0246891 A1* | 8/2020 | Mehlman ............. | B23K 9/1336 |

FOREIGN PATENT DOCUMENTS

GB            772387 A        4/1957

* cited by examiner

*Primary Examiner* — Brian W Jennison
(74) *Attorney, Agent, or Firm* — Dickinson Wright PLLC

(57)          ABSTRACT

An orientation and guide mechanism for a welding system includes a pair of opposed guide members. A weld wire having a non-round cross-section is fed through a guide passageway formed between the guide members, each of which have recessed channels that combine to define the guide passageway. The guide passageway has a non-round shape corresponding to the non-round shape of the wire. The orientation mechanism and the guide members thereof is adjustable relative to a welding device of the weld system, such that the orientation of the wire can be controlled and maintained by adjusting the orientation mechanism. The wide side of the wire may be adjusted to be presented to a radiant energy source, and/or the non-round wire may be adjusted relative to the desired weld seam.

18 Claims, 11 Drawing Sheets

Fig. 5A　　　　Fig. 5B　　　　Fig. 5C

ORIENTATION AND GUIDE MECHANISM FOR NON-CIRCULAR WELD WIRE

FIELD

The present disclosure relates to welding systems. In particular, the present disclosure relates to mechanisms for controlling the orientation of a weld wire such as a wire electrode having a non-circular cross-section.

BACKGROUND

Metal Inert Gas (MIG) welding also referred to as "wire-feed" or Gas Metal Arc Welding (GMAW) utilizes heat from an electrical arc to melt a consumable electrode (also known as a weld wire) to form a weld on a workpiece. A MIG welding system typically includes a power supply, a gas supply and an electrode supply connected to a welding device or welding gun. A ground cable is used to connect the workpiece to the power supply. The welding device generally includes a handle, a gooseneck and an end assembly. The welding system can be automatic or semi-automatic and may be manually or robotically controlled. The electrode and gas are coupled through a conduit in the handle and the gooseneck to the end assembly of the welding device. The electrode extends through the contact tip of the end assembly and the gas moves around the contact tip in the nozzle of the end assembly. When the welding device is activated, the electrode is fed through the contact tip toward the workpiece and the gas is directed through the nozzle towards the workpiece. When the electrode is placed adjacent to or in contact with the workpiece, the electrode completes an electrical circuit between the power supply and the workpiece, allowing current to flow through the electrode to the workpiece. The current produces an arc between the electrode and the workpiece. The heat of the arc melts the electrode and the workpiece in the region surrounding the arc, creating a weld puddle. The gas flowing out the nozzle shields the weld puddle from atmospheric gases and outside contaminants. The type of gas used in MIG welding varies depending on many factors. Noble or inert gases such as Argon are often used. However, Carbon Dioxide ($CO_2$) and a mixture of gases such as $CO_2$ and Argon are also used. Once the electrode is moved away from the workpiece, the electric circuit is broken and the weld puddle cools and solidifies, forming a weld.

Laser welding systems or radiant energy welding systems are also configured to use a consumable electrode or weld wire that is fed to the end of the welding system such that the wire and/or the workpiece are heated by the radiant energy source or laser to create a weld at the desired interface.

Traditional weld wire is circular in shape, and due to its circular cross-section its orientation through the welding system and the end assembly is of no concern. The circular weld wire is pushed and/or pulled through the system for delivery to the desired location of the weld, where the wire and/or workpiece are heated to create the weld.

Circular weld wire, having a circular cross-section, is difficult to orient and control about its axis. Circular weld wire cannot be adjusted relative to a weld heat source to provide different weld characteristics based on the orientation of the wire, because rotation of such a wire provides the same profile regardless or orientation about its axis.

Non-circular weld wire, on the other hand, has different geometric characteristics relative to a workpiece depending on its orientation. For example, a weld wire with an elliptical or oval cross-section may produce a different depth or width of a weld along a given weld path depending on its orientation.

One approach to controlling the orientation of the non-circular wire is through the use of a contact tip of a welding end assembly having a bore that matches the shape the non-round wire. The end assembly having the contact tip and non-round bore fixed thereto can therefore be adjusted relative to the workpiece, or the workpiece can be adjusted relative to the end assembly, to orient the non-round shape as desired along a weld path.

However, such adjustments to the orientation of the welding assembly and/or the workpiece relative thereto can be cumbersome or otherwise difficult to perform.

Thus, improvements can be made in controlling the orientation of a non-round wire.

SUMMARY

In one aspect of the disclosure, a non-circular weld wire, having a non-circular cross-section, can be oriented and controlled by using a guide mechanism that defines a passageway corresponding in shape to the cross-section of the non-circular weld wire. The guide mechanism may be oriented to a desired position, thereby controlling and orienting the non-circular weld wire in the desired manner.

The guide mechanism may be in the form of pads or rollers. The wire may have an oval cross-section, elliptical cross-section, or other non-circular cross section. The wire may be a solid wire or a cored wire. The system may be used for orienting the wire relative to various types of welding heat sources and/or work pieces. The orientation may be controlled without requiring adjustment of the orientation of the end assembly or the workpiece relative thereto.

In one aspect, a system for orienting a non-circular weld wire relative to a welding device is provided, the system including: an adjustable orientation mechanism having a guide member defining a passageway having a non-circular shape; wherein the guide member is adjustable to orient the non-circular shape of the passageway, such that an orientation of a non-circular weld wire being fed through the passageway is controlled depending on the orientation of the guide member.

In one aspect, the guide member is a pair of rollers having a recessed channel formed therein.

In one aspect, the guide member is a pair of pads having a recessed channel formed therein.

In one aspect, the guide member includes a pair of rollers or pads that are adjustable relative to each other to adjust the spacing therebetween and the size of the recessed channel.

In one aspect, the cross-sectional shape of the passageway corresponds to an oval cross-section of a weld wire or an elliptical cross-section of a weld wire.

In one aspect, the system includes a weld wire having an oval or elliptical cross-section.

In one aspect, the welding device includes a radiant heat source, wherein the guide member is adjustable relative to the radiant heat source to control the orientation of the weld wire relative to the heat source.

In one aspect, the welding device is a one of laser, plasma, tig, mig, or electron beam welding device.

In one aspect, the welding device includes a weld gun having a passageway extending therethrough for feeding the weld wire, wherein the orientation mechanism is adjustable relative to the welding gun.

In one aspect, the system is configured to receive a weld wire having a pre-defined non-circular cross-section.

In one aspect, the guide member is configured to resiliently flex to adjust the size of the passageway in response to variations in the cross-section of the weld wire passing therethrough.

In one aspect, the guide member is not in the form of a bore of a contact tip of a weld gun.

In one aspect, the guide member is adjustable to orient the wire about its axis and relative to a desired weld seam.

In another aspect, a welding system for creating a weld at a weld location is provided, the welding system including: a welding device defining an elongate passageway therethrough configured to deliver a weld wire to a welding location; a weld wire extending through the elongate passageway, the weld wire having a non-round profile; an orientation mechanism associated with the welding device, the orientation mechanism having a pair of opposed guide members defining a guide passageway therebetween, wherein the guide passageway has a non-round shape configured to control an orientation of the weld wire extending therethrough; wherein the orientation mechanism is adjustable to orient the recessed channel and the weld wire extending therethrough; wherein the orientation is adjustable relative to the welding device and/or the welding location.

In one aspect, the guide members are a pair of opposed rollers, each of the rollers having a recessed channel with a shape corresponding to the non-round profile of the wire, wherein the recessed channels combine to define the guide passageway.

In one aspect, the guide members are a pair of opposed pads, each of the pads having a recessed channel with a shape corresponding to the non-round profile of the wire, wherein the recessed channels combine to define the guide passageway.

In one aspect, the non-round profile has the shape of an oval or an ellipse.

In another aspect, a method of controlling an orientation of a non-round weld wire being fed through a welding system is provided, the method including the steps of: conveying a weld wire having a non-round cross-section through a passageway of a welding device; conveying a the weld wire having the non-round cross-section through an orientation mechanism associated with the welding device; adjusting and controlling the orientation of the orientation mechanism and, in response thereto, controlling the orientation of the weld wire about the longitudinal axis thereof; whereby the orientation of the weld wire is controllable relative to the welding device or a workpiece to be welded such that the non-round cross-section is selectably aligned relative to the welding device or the workpiece to be welded; wherein the orientation mechanism includes a pair of opposed guide members, wherein the guide members are sized to correspond to the non-round shape of the weld wire such that the orientation of the weld wire is maintained as the weld wire passes through a guide channel of the orientation mechanism.

In one aspect, the guide members are a pair of opposed rollers, each of the rollers having a recessed channel with a shape corresponding to the non-round profile of the wire, wherein the recessed channels combine to define the guide passageway.

In one aspect, the guide members are a pair of opposed pads, each of the pads having a recessed channel with a shape corresponding to the non-round profile of the wire, wherein the recessed channels combine to define the guide passageway.

BRIEF DESCRIPTION OF THE DRAWINGS

FIG. 5A is a top view of the weld wire oriented aligned with a weld seam;

FIG. 5B is a top view of the weld wire oriented at an angle relative to the weld seam;

FIG. 5C is a top view of the weld wire transverse to the weld seam;

DETAILED DESCRIPTION OF THE DRAWINGS

FIGS. 1-13 illustrate various orientation mechanisms 100, 200 for use with a non-circular weld wire 48, such as weld wire with an elliptical cross-section or an oval cross-section. The illustrated orientation mechanisms 100, 200 may be used in a variety of weld applications for delivery of the non-round wire 48 to the heat source of the weld system (laser, plasma, TIG, MIG, electron beam etc.). These mechanisms 100, 200 may be disposed at various locations along the feed of the wire 10 such that the mechanism 100, 200 is operable to orient and maintain control of the orientation of the wire as it engages with the workpiece. The mechanisms 100, 200 for example can be disposed upstream of the end assembly of the welding system or downstream of the end assembly, depending on the type of welding system that is used. For example, in a laser welding system, where heat is applied downstream from the end assembly via the laser at the location of the weld, the mechanism 100, 200 may be disposed at the downstream end. In a MIG welding system, the mechanism 100, 200 may be disposed upstream of the end assembly so as not to interfere with the contact tip of the arc being formed at the downstream end of the end assembly.

Figure 1:
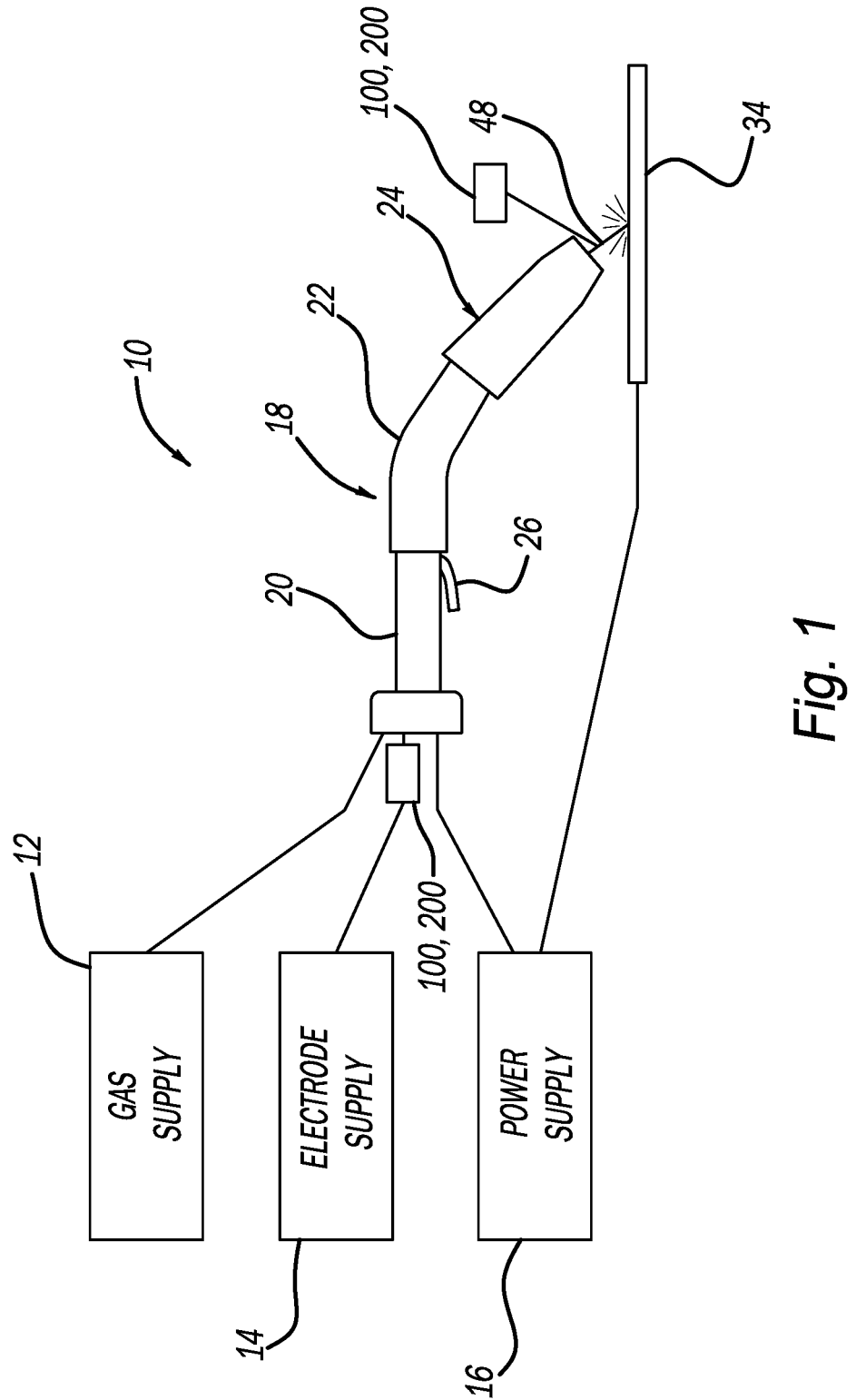
FIG. 1 is a schematic view of a welding system including an orientation mechanism for orienting a non-round wire.

With reference to FIG. 1, orientation mechanism 100, 200 is illustrated schematically upstream of the welding device 18 and downstream from the wire supply 14, which produces and/or feeds the wire 48 toward the welding device 18. FIG. 1 is a general, schematic representation of MIG welding system 10. The welding system 10 includes gas supply 12, electrode supply 14, and electrical power supply 16 connected to welding device 18. In general, welding device 18 includes handle 20, gooseneck 22 and end assembly 24. Welding device 18 also includes an activation switch which, in one embodiment, is trigger 26 on handle 20. Welding system 10 is used to perform a welding operation on workpiece 34. As described above, the present disclosure may also be applicable to other welding systems, but the MIG system 10 is shown in FIG. 1.

As the wire 48 is fed through the welding system 10, the wire 48 passes through the handle 20, gooseneck 22, and end assembly 24 and is delivered out of the end assembly 24 to the workpiece, where the wire 48 is heated and applied to create a weld along workpiece 34.

Figure 2:
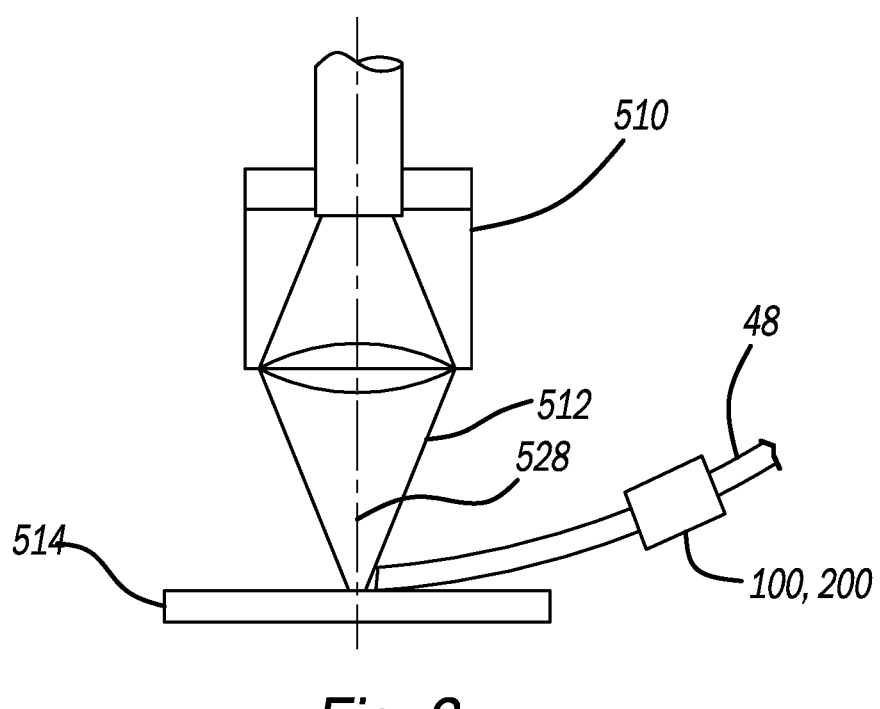
FIG. 2 is a schematic view of a laser welding system including an orientation mechanism for non-round wire.
Figure 3:
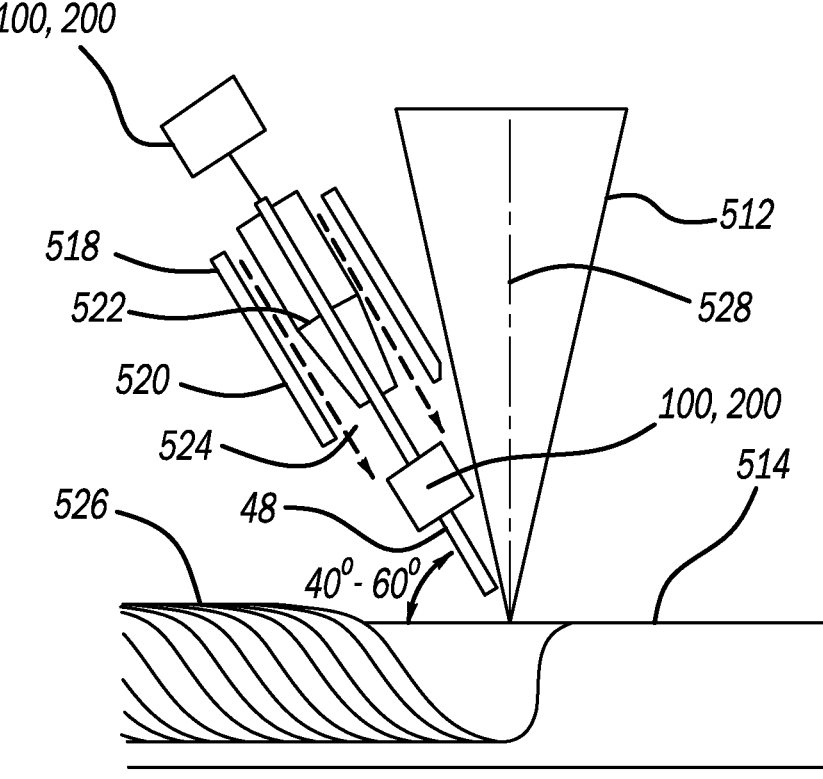
FIG. 3 is a schematic view of the laser welding system.

With the MIG welding system 10 having been described, a laser welding system will now be described. FIGS. 2 and 3 illustrate laser source 510 which presents a focused beam 512 of laser energy onto workpiece 514. Wire 48 is continuously fed through a torch 518 to the weld site as laser source 510 and the wire is advanced along a weld bead line along workpiece 514 (most frequently to join separate metal pieces). In such processes, laser source beam 512 is directed to impinge upon filler wire 48 to directly heat the wire by a process of absorption of a portion of the laser energy by the wire material. In an embodiment of the invention, beam 512 has beam properties sufficient to cause melting of the parent material of workpiece 514 as well as the material of filler wire 48.

FIG. 3 shows features of welding torch 518 having nozzle 520 and contact tip 522. A central bore through contact tip 522 guides filler wire 48 to the weld site. As shown, an annular space is present between the outer circumference of contact tip 522 and the inside of tubular nozzle 520 which allows a shielding gas flow 524 to be provided to the weld site to prevent oxidation and control weld properties. Workpiece 514 is shown with torch 518 advancing in the right-hand direction along a weld bead line of the workpiece, as the components are illustrated in FIG. 3. As shown, material of workpiece 514 and wire 516 are melted to create weld bead 526. FIG. 3 also illustrates an orientation between optical axis 528 of beam 512, which is shown as normal or nearly normal to the exterior surface of workpiece 514. FIG. 3 also illustrates that filler wire 48 is fed into the weld joint area at an oblique angle with respect to the workpiece surface and the longitudinal axis of filler wire 48 (designated as 40°-60°).

In one implementation of the process shown in FIG. 3, referred to as a "cold wire" process, filler wire 48 is fed into the weld site area without conducting electric current as is provided in ordinary MIG welding. Hybrid variations of these welding techniques can be provided including a laser/hot electrode wire system in which electric current is conducted through filler wire 48, referred to as a "hot wire" system. Such electric current can be sufficient merely to heat filler wire 16 to a temperature below its melting point which tends to soften the wire and may improve its absorption characteristics of laser energy from beam 512. If a higher current is passed through filler wire 48, MIG welding conditions are provided and additional heating may be provided by laser beam 512 for purposes such as preheating the weld joint, or adding additional energy to the joint, which may be desired to properly precondition the weld area for welding, or to smoothen the weld bead. In such hybrid applications, laser beam 512 may not directly intersect with a surface of filler wire 48 while the wire is in a solid form.

As described above, the orientation mechanisms 100, 200 may be applied to various types of welding systems. It will be appreciated that reference to elements of the MIG or laser system are applicable to other systems, unless otherwise specified.

FIG. 1 illustrates orientation mechanisms 100 and/or 200 disposed upstream and/or downstream of the weld gun or torch 18 to control the orientation of wire 48 being provided by electrode supply 14, thereby controlling the positioning of the wire 48 at the location of the weld along workpiece 34.

FIGS. 2-3 similarly illustrate orientation mechanism 100 and/or 200 disposed upstream and/or downstream of the weld gun or torch 518 for controlling the orientation of wire 48.

Figure 4:
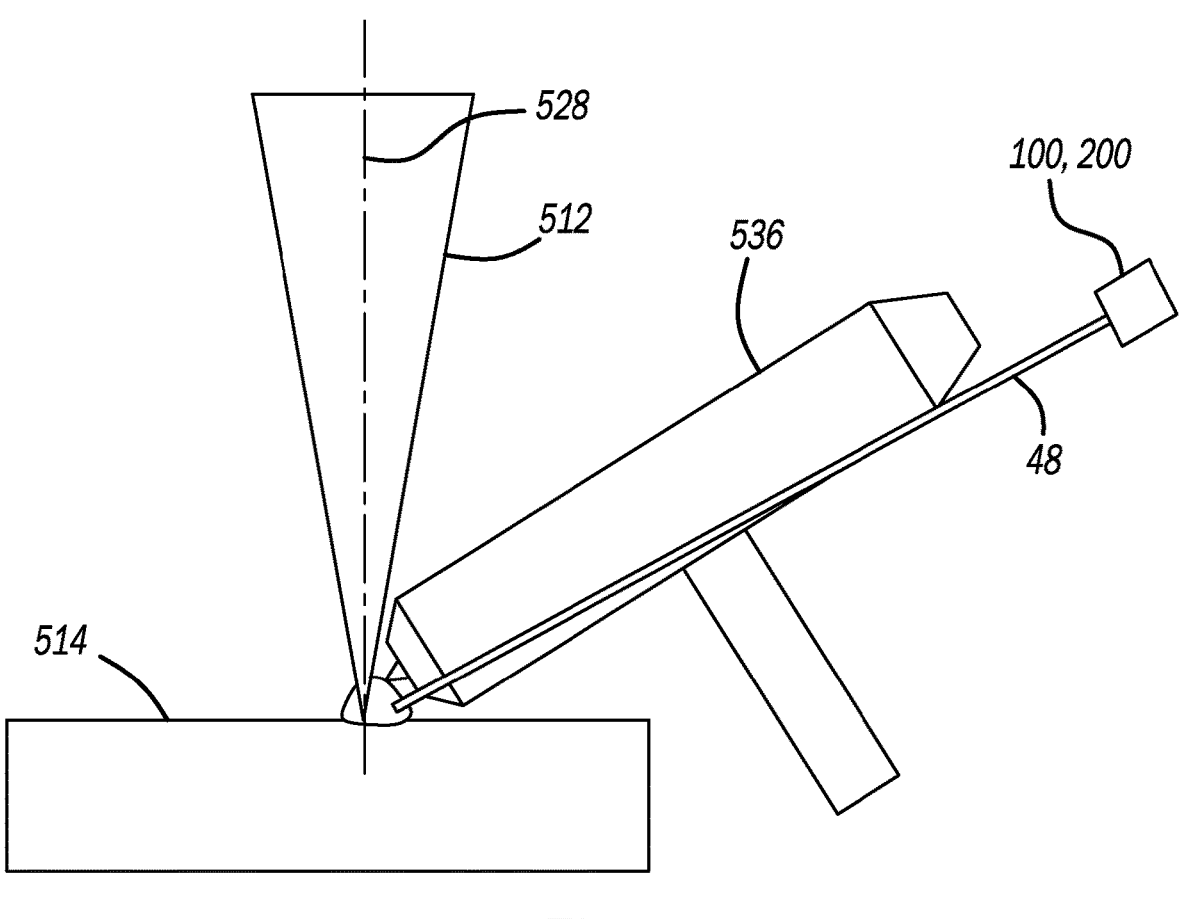
FIG. 4 is a schematic view of the laser welding system.

FIG. 4 represents a laser-plasma hybrid system. In this implementation, laser beam 512 acts with plasma torch 536 to provide thermal energy for the welding process. The interaction between the plasma volume created by plasma torch 536 and filler wire 48 is further enhanced by the non-round cross-sectional shape of the filler wire as there is better energy absorption. Orientation mechanism 100, 200 are shown upstream of the plasma torch 536, but could also be placed downstream.

In one aspect, shown in FIGS. 6-9, orientation mechanism 100 is in the form of or opposed rollers 102 disposed on opposite sides on the wire 48. As shown, wire 48 has an elliptical or oval cross-section. The elliptical or oval cross-section of the wire 48 may be produced from a circular wire stock, and may be pre-formed and stored in the electrode supply 14 (such as a roll of wire from which the wire is unspooled and fed into the system 10). In another aspect, the wire 48 may have a round cross-section when stored in the electrode supply 14, and may be formed after being fed and unspooled from the electrode supply, but prior to being delivered to the orientation mechanism 100. Thus, upon reaching the orientation mechanism 100, the non-round wire 48 may be considered to be pre-formed or pre-defined.

The wire 48, therefore, need not have any particular orientation prior to reaching the orientation mechanism 100. The orientation mechanism 100 is operable to re-orient the wire from whatever orientation it may have when being delivered or fed from the electrode supply to the heat source.

In another aspect, shown in FIG. 10-13, the orientation mechanism 200 may have pads 202 that, like the opposed rollers, feed the wire 48 through the orientation mechanism 200 while maintain the orientation of the wire 48. The pads 202, like the rollers 102, may be opposed to each other to define a non-circular passageway that controls the wire orientation.

The wire 48 is shown having a non-round shape as either an elliptical wire 48a or an oval wire 48b. Reference to the wire 48 may apply to either non-round shape, as well as other non-round shapes.

Each orientation mechanism 100, 200 may keep the wire 48 oriented relative to the heat source of the welding system 10, 510 (or other welding system) for increased control. For example, as the wire 48 is being fed toward the heat source, the wide side of the wire 48 may be presented to the heat source. If the orientation mechanism 100, 200 is rotated 90 degrees about the axis of the wire 48, the narrow side of the wire 48 may be presented to the heat source.

In addition to controlling and/or maintaining the orientation of the wire 48 relative to the welding device 18, 518 via the orientation mechanism 100, 200, the orientation of the wire 48 may be controlled and maintained relative to the weld seam or the direction of the weld. The wire 48 may similar be oriented relative to the "heat source" which may refer to laser, MIG, TIG, or the like. For purposes of discussed, the welding device 18, 518 will be referred to generally to include different heat sources, weld guns, torches, and the like.

Controlling this orientation of the wire 48 relative to the heat source and/or the weld seam can control the shape of the weld puddle and/or the depth of the weld, thereby allowing for a more specific tailoring of the type of weld to account for various design needs. When the wire orientation is controlled by the mechanism 100, 200, the orientation can be adjusted by adjusting the mechanism 100, 200 relative to the welding device 18, 518, while keeping the welding device in a given orientation or position. Alternatively, while maintain or controlling the orientation of the wire 48 relative to the welding device, the welding device itself can have its orientation adjusted relative to the heat source and/or the weld seam to adjust the relative orientation between the wire 48 and the heat source and/or weld seam.

FIGS. 5A-5C illustrate the orientation of the wire 48 relative to weld seam 515 formed along workpiece 514, such as the wide side extending across the seam 515 (FIG. 5C), at an oblique angle relative to the seam 515 (FIG. 5B), or being aligned with the seam (FIG. 5A). As described above, by controlling the orientation via the mechanism 100, 200, the orientation of the wire 48 is likewise controlled. The controlled orientation may be accomplished relative to the welding gun and/or the welding seam.

As described above, the orientation mechanisms 100 may include guide members in the form of opposed rollers 102 having recessed channels 104 that correspond to the shape of the non-round wire. The shape of the recessed channels 104 need not exactly match the profile or the shape of the wire 48, but may also just provide some non-circular shape corresponding to the wire such that the wire cannot rotate substantially relative to the shape of the recessed channels 104. For example, a rectangular channel shape could be used along with an oval or ellipse shape of the non-round wire. The recessed channels 104 combine to define a guide passageway extending through the orientation mechanism 100.

Figure 6:
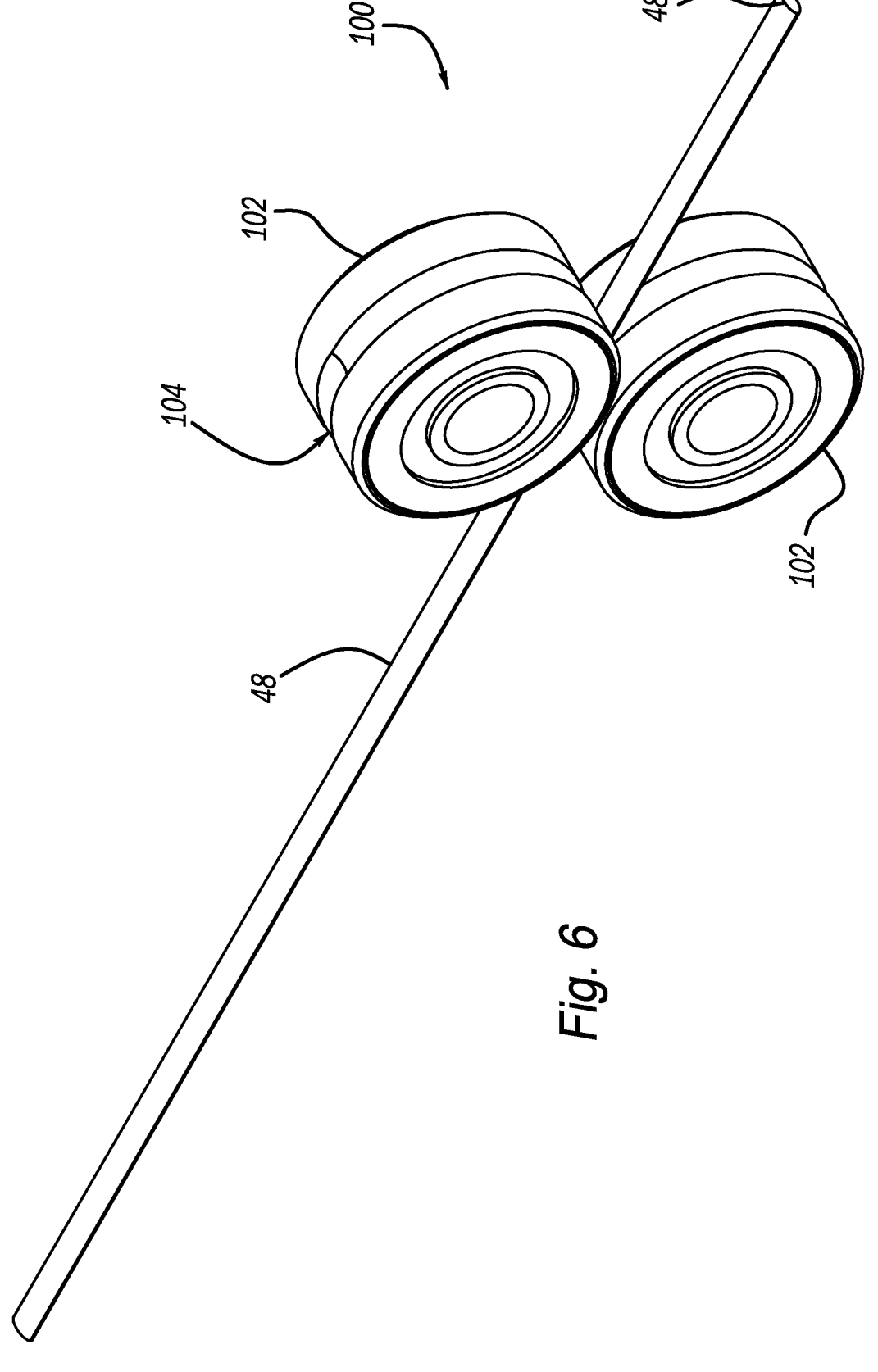
FIG. 6 is a perspective view of an orientation mechanism having guide members in the form of rollers for guiding a non-round wire having an elliptical cross-section.
Figure 7:
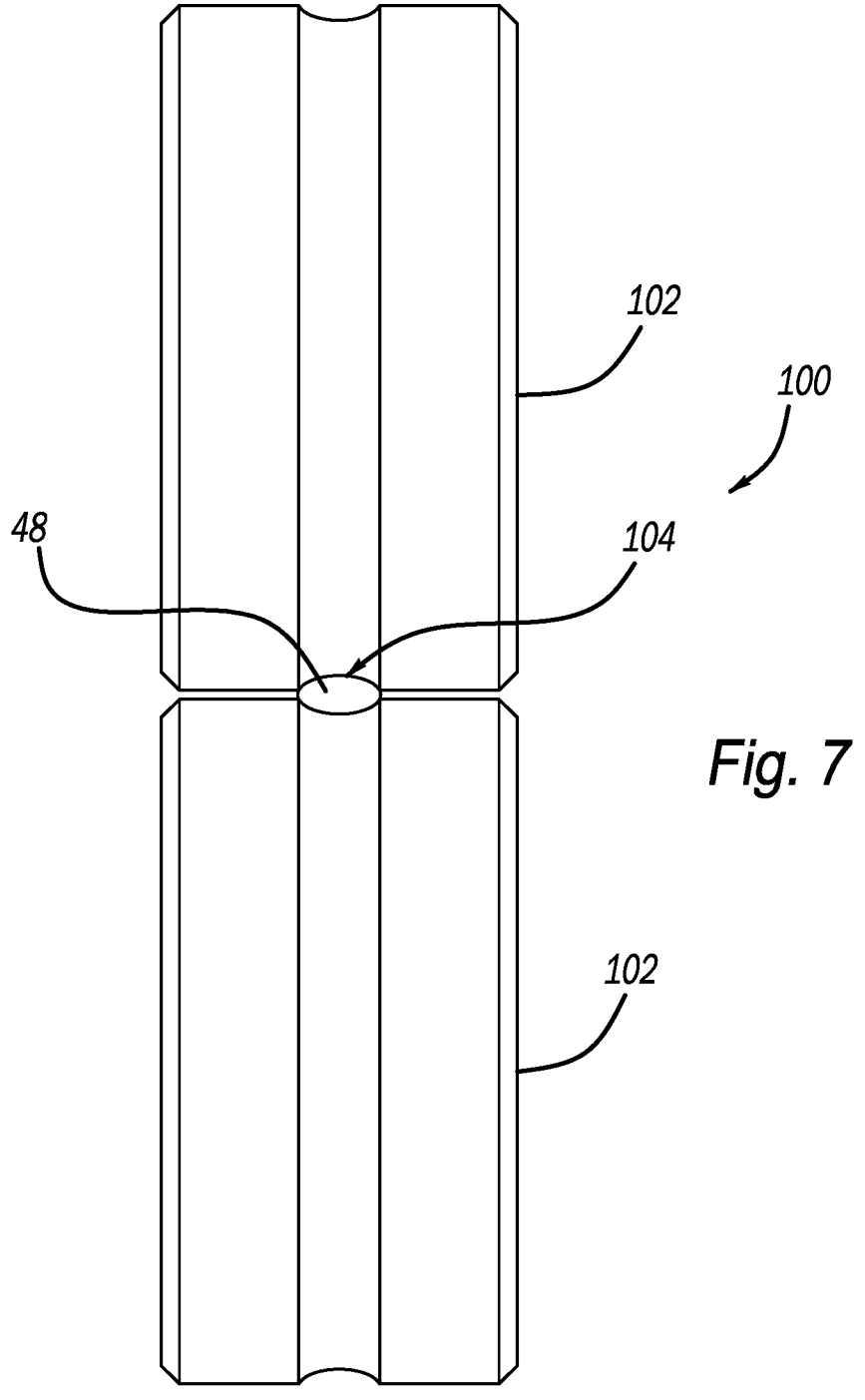
FIG. 7 is an end view of the orientation mechanism of FIG. 6 illustrating a recessed channel having a shape corresponding to the elliptical cross-section of the wire.
Figure 8:
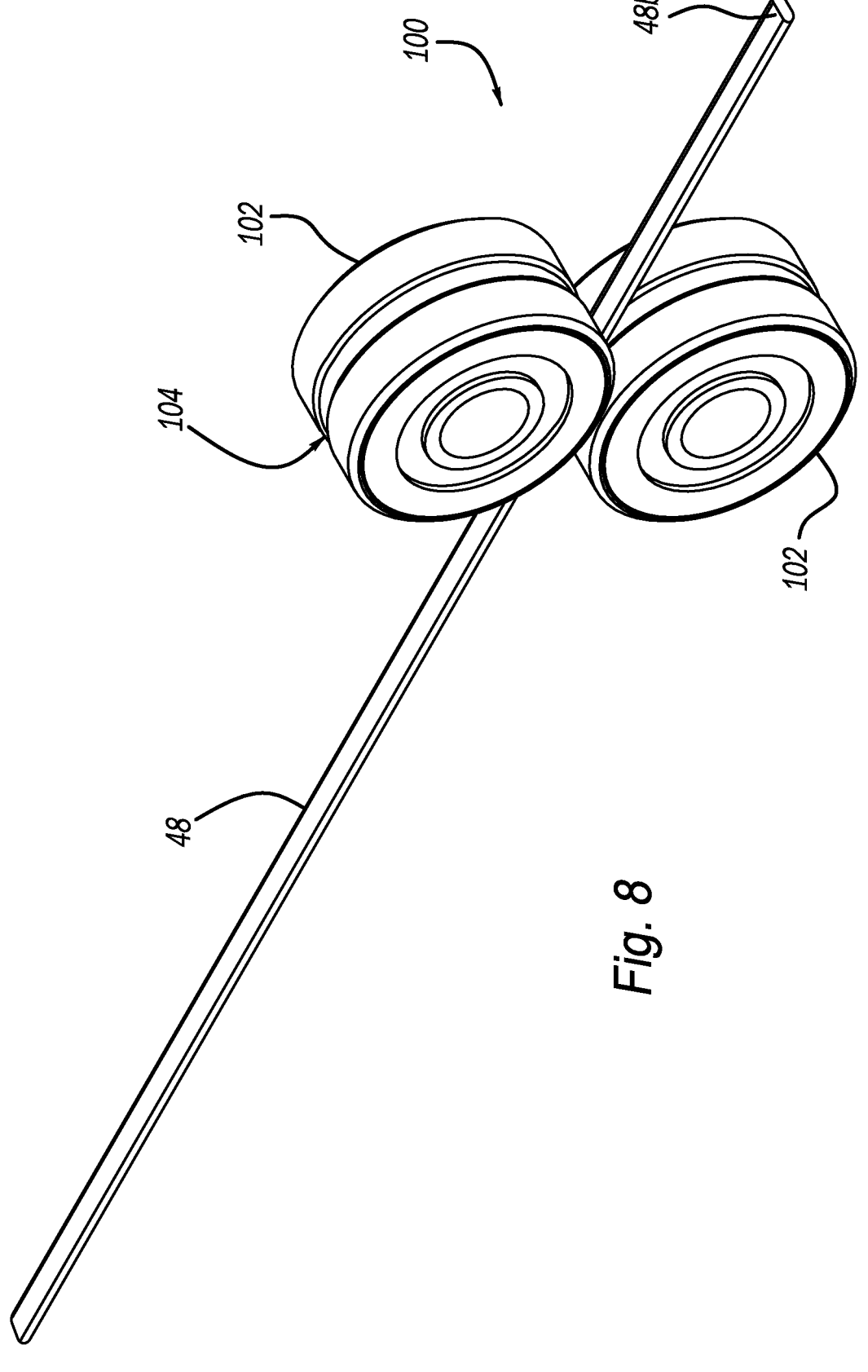
FIG. 8 is a perspective view of an orientation mechanism having guide members in the form of rollers for guiding a non-round wire having an oval cross-section.
Figure 9:
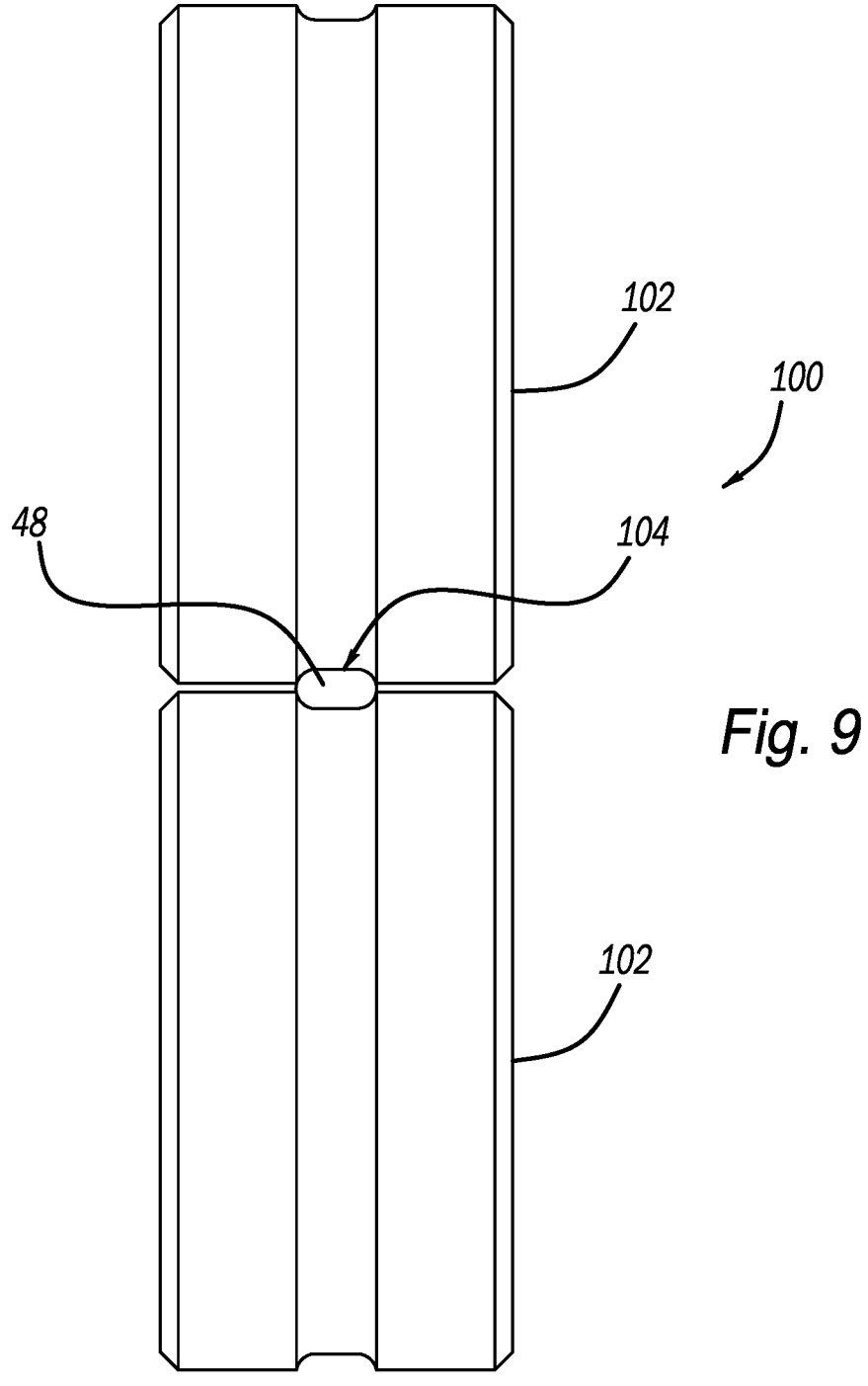
FIG. 9 is an end view of the orientation mechanism of FIG. 8 illustrating a recessed channel having a shape corresponding to the oval cross-section of the wire.

FIGS. 6 and 7 illustrate an ellipse shaped wire 48a being guided and controlled by rollers 102 having a corresponding ellipse shaped channel 104. FIGS. 8 and 9 illustrate an oval shaped wire 48b being guided and controlled by rollers 102 having a corresponding oval shaped channel 104. As shown, the guide passageway formed by the recessed channels 104 may correspond to the cross-sectional shape of the wire 48. Thus, various recessed channel shapes can be used in the rollers 102.

In another aspect, as in orientation mechanism 200, guide members may be in the form of opposed pads 202 that define an elongated channel 204 that correspond in shape to the cross-section of the non-round wire. As mentioned previously, the shape of the channel 204 need not match the profile of the non-round wire 48 exactly.

Figure 10:
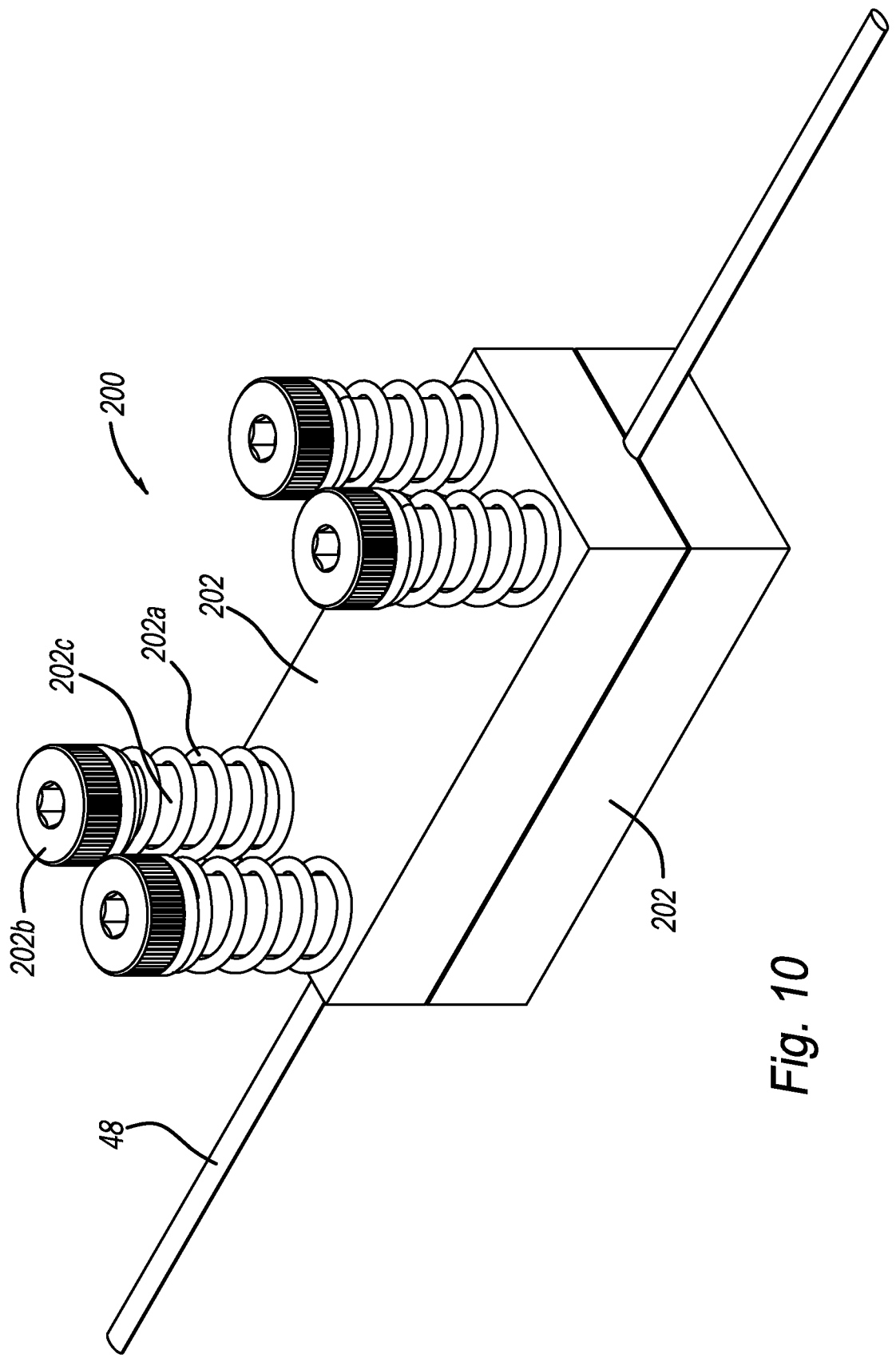
FIG. 10 is a perspective view of an orientation mechanism having guide members in the form of pads for guiding a non-round wire having an elliptical cross-section.
Figure 11:
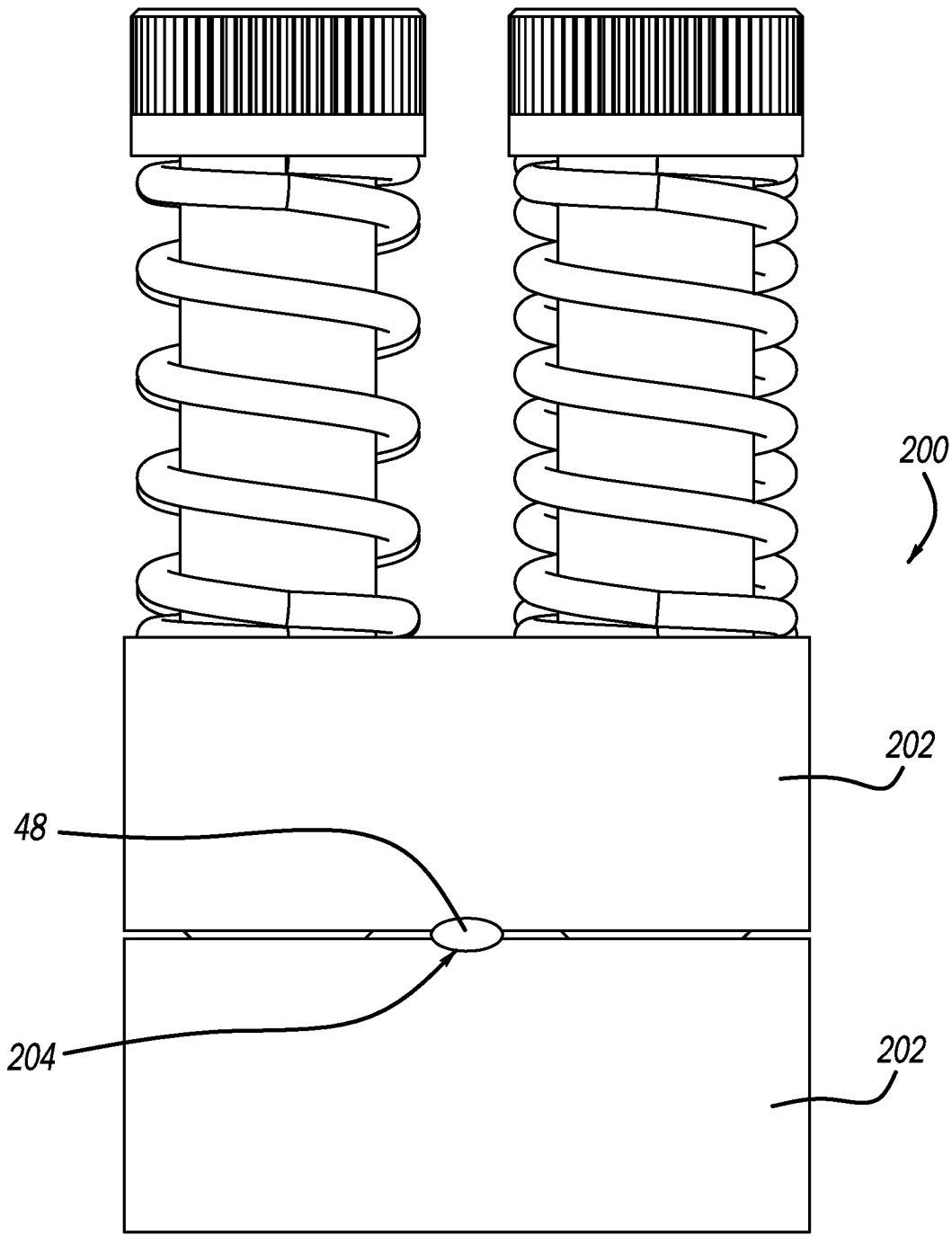
FIG. 11 is an end view of the orientation mechanism of FIG. 10 illustrating recessed channels defined in the pads having a shape corresponding to the elliptical cross-section of the wire.
Figure 12:
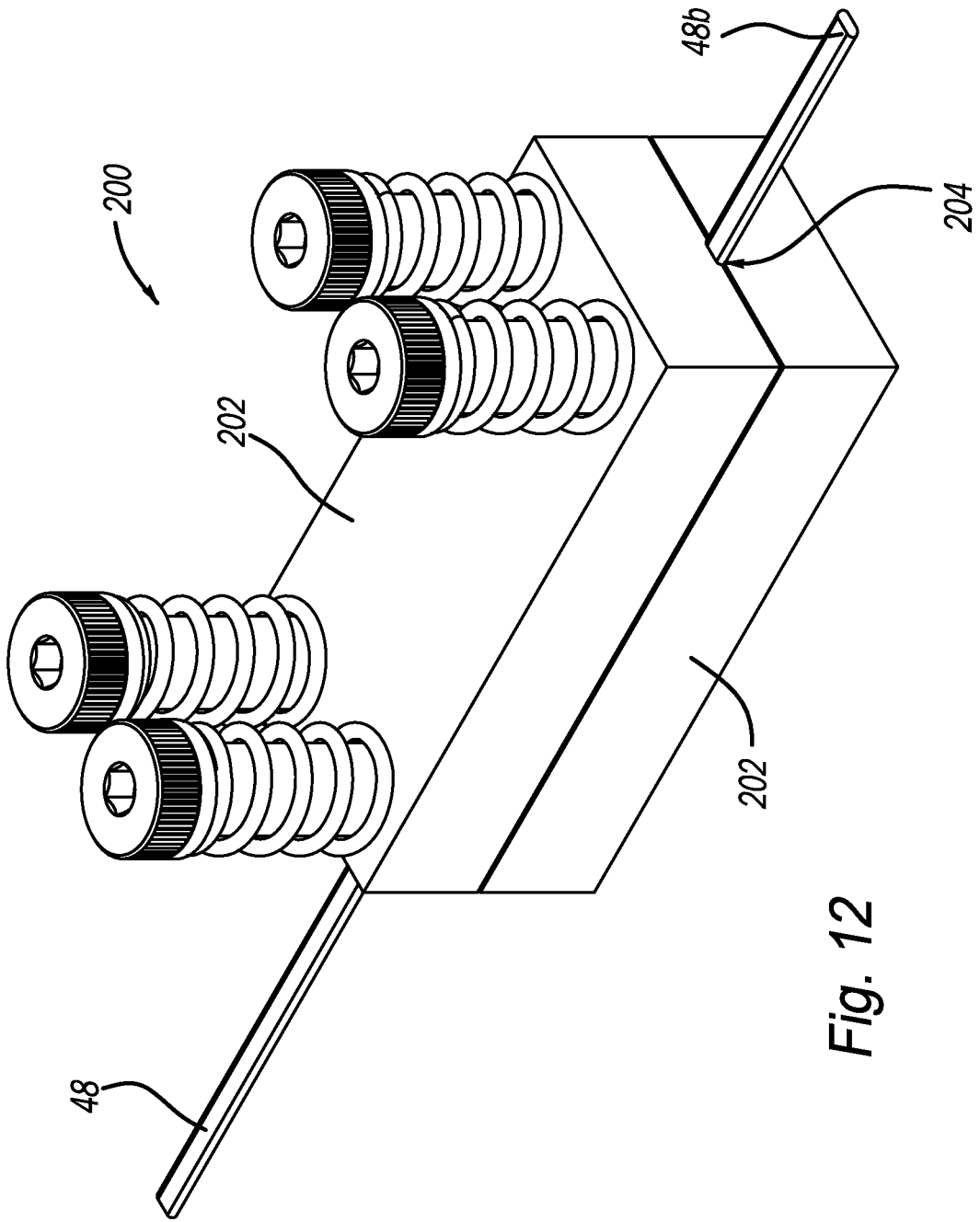
FIG. 12 is a perspective view of an orientation mechanism having guide members in the form of pads for guiding a non-round wire having an oval cross-section wire.
Figure 13:
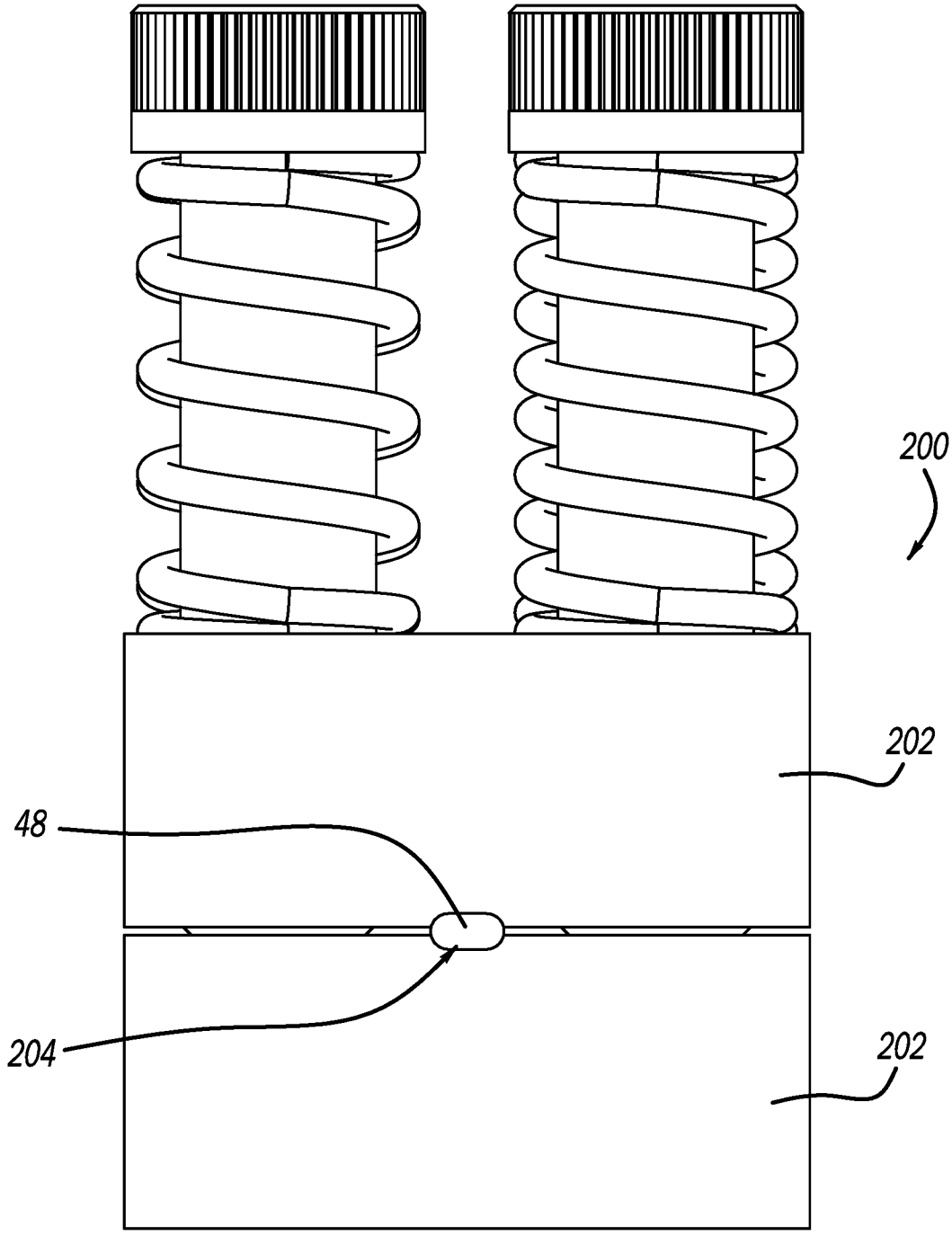
FIG. 13 is an end view of the orientation mechanism of FIG. 7 illustrating recessed channels defined in the pads having a shape corresponding to the oval cross-section of the wire.

FIGS. 10 and 11 illustrate an ellipse shaped wire 48a being guided and controlled by pads 202 having a corresponding ellipse shaped channel 204. FIGS. 12 and 13 illustrate an oval shaped wire 48b being guided and controlled by rollers 202 having a corresponding oval shaped channel 204. As shown, the passageway formed by the recessed channels 204 may correspond to the cross-sectional shape of the wire 48. Thus, various recessed channel shapes can be used in the pads 202.

At least one of the pads 202 is shown as being spring loaded with one or more springs 202a. The spring loading on the pads 202 provides a secure retention mechanism on the non-round wire 48 while allowing for imperfections in the wire profile to be overcome as the wire 48 passes through the pads 202. The tension on the pads 202 may be adjustable as desired by adjusting the tension in the spring windings via knobs 202b mounted on the ends of posts 202c. The tension or bias on the pads 202 to retain the wire 48 in a controlled orientation can be provided in other manners that is not necessarily spring loaded.

Similarly, tension may also be provided on the guide members of the orientation mechanism 100 that are in the form of the rollers 102. The pins or axles (not shown) about which the rollers 102 are mounted may be spring loaded in a similar fashion, with the spring bias being adjustable by adjusting the tension on the springs.

In another aspect, the positon of the guide members 102, 202 (rollers or pads) relative to each other can be adjusted without a spring mechanism or tension. In this aspect, the size of the channel 104 or 204 defined by the internal curvature or profile of can be increased or decreased to accommodate the expected size of the cross-section of the wire 48. The rollers 102 or pads 202, once adjusted, may be kept in a fixed position relative to each other, with an appropriate tolerance or sizing to account for imperfections in the wire profile.

The use of a spring tension for the orientation mechanism 100, 200 may also allow for the same mechanism to be used for wires 48 of various sizes, without requiring adjustment of the rollers 102 or pads 202 relative to each other for similarly shaped wires. Of course, for wires of substantially different sizes, the rollers 102 or pads 202 may be adjustable relative to each other while also including the spring tension.

The non-circular wire 48, as described above, has a pre-defined shape, and the actual pre-defined shape may vary from time to time. Accordingly, pads 202 and rollers 102 may also be replaced with ones having different channel sizes, in addition to adjusting the spacing between them. For example, wires 48 may have different widths where adjusting the space between the guide members would not account for the different lateral width. As described, the same pads 202 or rollers 102 may be used with slightly different shapes while maintaining orientation control. The ability to adjust/replace the pads and rollers to account for different wire sizes and to maintain orientation control may allow for the same weld gun/torch to be used for a wide variety of wire shapes and sizes. For example, a given wire gun with a passageway large enough to accommodate a variety of wire sizes may be used, with the guide members of the orientation mechanism 100, 200 providing the location control. Thus, a contact tip or other bore shape, for example, may remain circular rather than being matched to the size/shape of the non-round wire. Thus, off the shelf weld guns and/or end assemblies may be used along with the orientation mechanism, rather than using a specialty contact tip or the like having a matching bore shape.

As described previously, the orientation mechanisms 100, 200 may be placed at different locations of the weld system, so long as orientation control can be maintained at the location of the heat source and/or the weld. For example, the orientation mechanism 100, 200 may be disposed upstream or downstream of the weld gun/torch. However, the orientation mechanism may also be disposed at multiple locations in a single weld system. For example, the mechanisms 100, 200 may be disposed both upstream and downstream of the gun/torch. Multiple orientation mechanisms may be arranged in series along a feed path of the weld wire 48 to assist in the delivery of the wire 48 from the wire supply source.

The pads 202 or rollers 102 may themselves be rotatable or adjustable relative to the axial direction or feed direction of the wire 48, or relative to the weld gun/torch, thereby correspondingly changing the orientation of the wire 48 as it is fed toward through the welding device and toward the welding location (where it may be impacted by a radiant heat source or otherwise heated/melted at the weld seam). This orientation about the feed direction/axis may occur during a wire feed operation and during a welding operation, which may transition the weld properties along a given weld path corresponding to the change in the orientation.

Thus, the use of the orientation mechanism 100, 200 with a variety of known welding systems designed for circular wire provides for a modular and easily adjustable approach to controlling the orientation of a non-round weld wire without requiring replacement of the existing welding system to provide matching non-round bores or increased weld gun adjustability. Thus, the advantages of non-round wire and control of the orientation of non-round wire can be realized more easily across existing welding setups by the inclusion of the above-described orientation mechanism. It will be appreciated by those skilled in the art that the above described novel orientation mechanisms 100, 200 may be added to different locations along the wire feed path as necessary without resorting to undue experimentation, and that the specific installation frame, fasteners, or the like need not be shown or described in detail.

In some instances, control of the wire orientation may be performed to present the wire to the heat source or welding device. In instances where the wire is not impacted with radiant energy, controlling the orientation is still beneficial in that it can be orientation relative to the weld seam, or the wire 48 may be controlled relative to the weld pol that is being created, which itself provides heat relative to the wire 48 such that control of the wire orientation can affect the properties of the weld bead.

The process of feeding a weld wire through a weld system and creating a weld via various welding approaches need not be descried in detail. The weld wire 48 may be in the form of a wire electrode for "hot" welding systems, filler wire, or the like, the orientation of which can be controlled by the orientation mechanism described herein.

The capabilities of the above described orientation mechanism 100, 200 are evident from the above description. In one aspect, a method of controlling an orientation of a non-round weld wire being fed through a welding system is provided, the method including the steps of: conveying a weld wire having a non-round cross-section through a passageway of a welding device; conveying a the weld wire having the non-round cross-section through an orientation mechanism associated with the welding device; adjusting and controlling the orientation of the orientation mechanism and, in response thereto, controlling the orientation of the weld wire about the longitudinal axis thereof; whereby the orientation of the weld wire is controllable relative to the welding device or a workpiece to be welded such that the non-round cross-section is selectably aligned relative to the welding device or the workpiece to be welded; wherein the orientation mechanism includes a pair of opposed guide members, wherein the guide members are sized to correspond to the non-round shape of the weld wire such that the orientation of the weld wire is maintained as the weld wire passes through a guide channel of the orientation mechanism.

In one aspect, the guide members are a pair of opposed rollers, each of the rollers having a recessed channel with a shape corresponding to the non-round profile of the wire, wherein the recessed channels combine to define the guide passageway.

In one aspect, the guide members are a pair of opposed pads, each of the pads having a recessed channel with a shape corresponding to the non-round profile of the wire, wherein the recessed channels combine to define the guide passageway.

The above described method may be adjusted or supplemented according to the capabilities and function of the above described orientation mechanisms 100, 200 and associated welding systems and devices.

Additional benefits of specific orientations of non-round weld wire are described in further detail in U.S. patent application Ser. No. 16/491,508, filed Sep. 5, 2019 and published as US 2020/0016694, the entire content of which is hereby incorporated by reference in its entirety.

While the above description constitutes the preferred embodiment of the present invention, it will be appreciated that the invention is susceptible to modification, variation and change without departing from the proper scope and fair meaning of the accompanying claims.

What is claimed is:

1. A system for orienting a non-circular weld wire relative to a welding device, the system comprising:
   an adjustable orientation mechanism having a guide member defining a guide passageway having a non-circular shape;
   wherein the guide member is rotatably adjustable to rotationally orient the non-circular shape of the passageway, such that a rotational orientation of a non-circular weld wire being fed through the passageway is controlled depending on the orientation of the guide member;
   wherein the guide member is a pair of rollers or pads having a recessed channel formed in each of the rollers or pads;
   wherein the recessed channels combine to define the guide passageway;
   wherein the system is configured to receive a weld wire having an oval or elliptical cross-section;
   wherein the cross-sectional shape of the guide passageway corresponds to the oval cross-section of the weld wire or the elliptical cross-section of the weld wire.

2. The system of claim 1, wherein the guide member is a pair of rollers.

3. The system of claim 1, wherein the guide member is a pair of pads.

4. The system of claim 1, wherein the pair of rollers or pads are adjustable relative to each other to adjust the spacing therebetween and the size of the recessed channel.

5. The system of claim 1 further comprising a weld wire having an oval or elliptical cross-section.

6. The system of claim 1, wherein the welding device includes a radiant heat source, wherein the guide member is adjustable relative to the radiant heat source to control the orientation of the weld wire relative to the heat source.

7. The system of claim 1, wherein the welding device is a one of laser, plasma, tig, mig, or electron beam welding device.

8. The system of claim 1, wherein the welding device includes a weld gun having a passageway extending therethrough for feeding the weld wire, wherein the orientation mechanism is adjustable relative to the welding gun.

9. The system of claim 1, wherein the system is configured to receive a weld wire having a pre-defined non-circular cross-section.

10. The system of claim 1, wherein the guide member is configured to resiliently flex to adjust the size of the passageway in response to variations in the cross-section of the weld wire passing therethrough.

11. The system of claim 1, wherein the guide member is not in the form of a bore of a contact tip of a weld gun.

12. The system of claim 1, wherein the guide member is adjustable to orient the wire about its axis and relative to a desired weld seam.

13. A welding system for creating a weld at a weld location, the welding system comprising:

a welding device defining an elongate passageway therethrough configured to deliver a weld wire to a welding location;

a weld wire extending through the elongate passageway, the weld wire having a non-round profile, wherein the weld wire has an oval or elliptical cross-section;

an orientation mechanism associated with the welding device, the orientation mechanism having a pair of opposed guide members defining a guide passageway therebetween, wherein the guide passageway has a non-round shape configured to rotationally control an orientation of the weld wire extending therethrough;

wherein the orientation mechanism is rotatably adjustable to rotationally orient the recessed channel and the weld wire extending therethrough;

wherein the rotational orientation is adjustable relative to the welding device and/or the welding location;

wherein the guide members are a pair of rollers or pads having a recessed channel formed in each of the rollers or pads;

wherein the recessed channels combine to define the guide passageway;

wherein the system is configured to receive the weld wire having an oval or elliptical cross-section;

wherein the cross-sectional shape of the guide passageway corresponds to the oval cross-section of the weld wire or the elliptical cross-section of the weld wire.

14. The welding system of claim 13, wherein the guide members are a pair of opposed rollers.

15. The welding system of claim 13, wherein the guide members are a pair of opposed pads.

16. A method of controlling an orientation of a non-round weld wire being fed through a welding system, the method comprising the steps of:

conveying a weld wire having a non-round cross-section through a passageway of a welding device, wherein the weld wire has an oval or elliptical cross-section;

conveying a the weld wire having the non-round cross-section through a rotational orientation mechanism associated with the welding device;

rotatably adjusting and controlling the rotational orientation of the orientation mechanism and, in response thereto, rotational controlling the rotational orientation of the weld wire about the longitudinal axis thereof;

whereby the rotational orientation of the weld wire is controllable relative to the welding device or a workpiece to be welded such that the non-round cross-section is selectably aligned relative to the welding device or the workpiece to be welded;

wherein the rotational orientation mechanism includes a pair of opposed guide members, wherein the guide members are sized to correspond to the non-round shape of the weld wire such that the rotational orientation of the weld wire is maintained as the weld wire passes through a guide passageway of the rotational orientation mechanism;

wherein the guide member is a pair of rollers or pads having a recessed channel formed in each of the rollers or pads;

wherein the recessed channels combine to define the guide passageway;

wherein the system is configured to receive a weld wire having an oval or elliptical cross-section;

wherein the cross-sectional shape of the guide passageway corresponds to the oval cross-section of the weld wire or the elliptical cross-section of the weld wire.

17. The welding system of claim 16, wherein the guide members are a pair of opposed rollers.

18. The welding system of claim 16, wherein the guide members are a pair of opposed pads.

* * * * *